United States Patent [19]
Gerry

[11] 3,961,609
[45] June 8, 1976

[54] PURE OXYGEN SUPPLY TO AN INTERNAL COMBUSTION ENGINE

[76] Inventor: Martin E. Gerry, 13452 Winthrope St., Santa Ana, Calif. 92705

[22] Filed: July 12, 1973

[21] Appl. No.: 378,437

[52] U.S. Cl. ............................ 123/119 E; 123/1 A; 123/3; 219/206; 219/207
[51] Int. Cl.² ........................................ F02M 25/06
[58] Field of Search .................... 123/1 A, 3, 119 E; 60/39.46; 423/587, 585, 583, 579; 252/186; 219/206, 207, 271

[56] References Cited
UNITED STATES PATENTS

| | | | |
|---|---|---|---|
| 2,862,482 | 12/1958 | Hart | 123/119 E |
| 3,658,043 | 4/1972 | Hoffman | 60/39.46 |
| 3,696,795 | 10/1972 | Smith et al. | 123/119 E |
| 3,709,203 | 1/1973 | Cettin et al. | 123/119 E |
| 3,792,690 | 2/1974 | Cooper | 123/119 E |
| 3,800,761 | 4/1974 | Sata | 123/119 E |

OTHER PUBLICATIONS

Encyclopedia of Chemical Technology, Kirk et al., vol. 10, pp. 47–48, 1953.
Industrial Chemistry, Riegel, Fifth Edition, pp. 360–365, 1949.

*Primary Examiner*—Charles J. Myhre
*Assistant Examiner*—Sheldon Richter

[57] ABSTRACT

A method for decreasing hydrocarbons and oxides of nitrogen emanating from the exhaust system of an internal combustion engine involves supplying substantially pure oxygen to the air intake means of the engine. Such pure oxygen may be passed from a tank in which it is stored to the air intake means of the engine. The pure oxygen may be created by storing a chemical compound in a chamber and heating the chamber so that the compound may release the oxygen, or oxygen can be created by electrolytically decomposing water, passing oxygen generated by such decomposition into a storage tank coupled to the air intake means of the engine.

5 Claims, 3 Drawing Figures

3,961,609

PURE OXYGEN SUPPLY TO AN INTERNAL COMBUSTION ENGINE

BACKGROUND OF THE INVENTION

This invention is in the field of fuel and air mixtures for use in an internal combustion engine.

The state of the automotive art is to draw in air from the atmosphere to mix with the fuel, such as gasoline or other petrol products, whether through a carburetor or a fuel injection system for providing this mixture to the combustion chamber so as to ignite this mixture therein.

The major problem with this method is that, aside from undesired chemicals in the fuel per se, the intake of air results in an intake of about 20% oxygen and 80% nitrogen.

Since oxygen is the only element needed to support combustion of the fuel, air necessarily inhibits complete combustion since the greatest portion of any given volume intake is nitrogen. This results in uncombusted portions of the fuel that make their way through the exhaust system into the atmosphere contributing to the hydrocarbon component of smog. It also results in very much reduced efficiency of engine operation and the wasting of a major portion of fuel, having economic consequences.

Additionally, the presence of the nitrogen of the air intake in combining with the fuel during combustion thereof results in objectionable nitrous oxides that are contaminants of the atmosphere.

SUMMARY OF THE INVENTION

It is therefore an object of this invention to decrease the hydrocarbon and nitrons oxide exhausts from ignition of fuel in an internal combustion engine by eliminating air intake and substituting therefor a source of substantially pure oxygen.

In accordance with this invention, a method for decreasing hydrocarbons and oxides of nitrogen emanating from the exhaust system of an internal combustion engine is provided by supplying substantially pure oxygen to the air intake means of the engine.

The pure oxygen is supplied from a tank in which it is stored.

The pure oxygen may be supplied by storing a chemical source of oxygen in a chamber which is heated so as to release the oxygen when the chemical source starts to decompose. The oxygen thus created is passed to the air intake means. Such chemical source may be one or more compounds of the group consisting of potassium perruthenate, potassium persulfate, calcium peroxide, potassium pyrophosphate, urea and any chemical compound containing oxygen that would not release hydrocarbons or nitrous oxides upon decomposition when heated at a temperature within the range of 100° to 360° farenheit.

Pure oxygen may also be obtained by electrolytically decomposing water into oxygen and hydrogen, storing the oxygen thus created in a tank, and passing the stored oxygen to the air intake means of the internal combustion engine.

DETAILED DESCRIPTION

Figure 1:
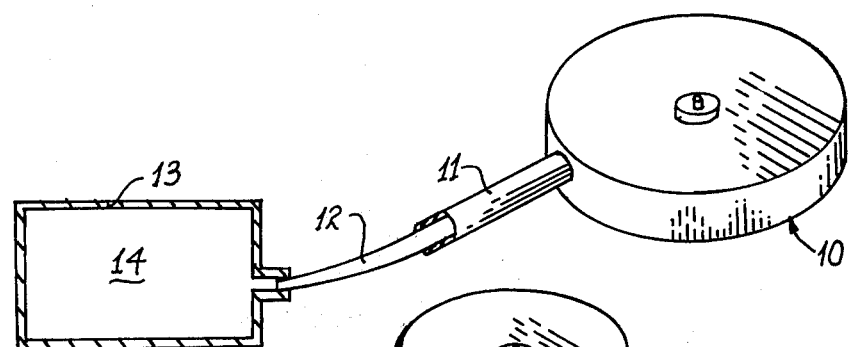
FIG. 1 is a view partially in perspective and partially in cross-section of an automotive air filter retainer, its intake connected to a tank containing substantially pure oxygen.

Referring to FIG. 1, conventional air filter retainer of an automobile as used for air intake, and normally affixed at its understructure to the air intake port of a carburetor (not shown), is indicated at 10.

Filter retainer 10 has an air intake extension 11 that is connected to a flexible hose as at 12. Flexible hose 12 is connected to a tank 13 normally used to retain pure oxygen 14, sometimes under pressure, therein. Pressure valves, open-shut, and oxygen-flow valves normal to such conventional oxygen storage tank is not shown.

Normally, the valves not shown would be adjusted for rate of oxygen flow as required to substitute for the air intake previously used by the automotive engine. It should be kept in mind that a substantially lesser quantity (about one-fifth) of the oxygen would be required as compared to prior air intake since no nitrogen is present for intake into filter retainer 10.

Figure 2:
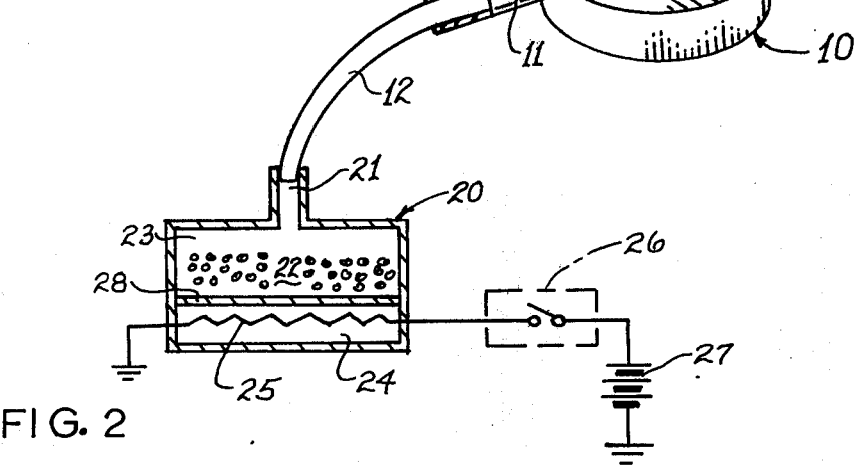
FIG. 2 is a view partially in perspective and partially in cross-section of an automotive air filter retainer, its intake connected to a heatable tank and containing an oxygen releasing compound.

Referring to FIG. 2, conventional air filter retainer of an automobile as used for air intake and normally installed as described in connection with FIG. 1 is indicated at 10.

Filter retainer 10 has air intake extension 11 that is connected to a flexible hose as at 12. Flexible hose 12 is connected to supply port 21 of chamber 20. Chamber 20 is provided with suitable opening for loading a suitable oxygen releasing compound 22 in compartment 23 thereof. Chamber 20 has another compartment 24 below compartment 23 in which is housed electrical heating element 25 electrically connected through ignition switch 26 to automotive battery 27.

Upon closing of the ignition switch to start the automobile engine the heating element will be energized to heat the oxygen releasing compound so as to supply oxygen directly to the air intake extension 11. Rate of oxygen supply will depend upon a number of variables such as the compound used, the temperature of element 25 and the rate of transfer of heat between compartment 24 and 23. These can be determined by making suitable selection of the compound to be used first which will dictate temperature required and hence the size or resistance of element 25 as well as the thickness of compartment separator wall 28 and the type of material used therefor.

Typical compounds and their decomposition temperatures are indicated in the table hereinbelow as follows:

| Compound | Formulation | Oxygen Release Temp. in degrees centigrade | Approximation Equivalent Farenheit Degrees |
|---|---|---|---|
| Potassium Perruthenate | $KRuO_4$ | 44 | 111 |

-continued

| Compound | Formulation | Oxygen Release Temp. in degrees centigrade | Approximation Equivalent Farenheit Degrees |
|---|---|---|---|
| Potassium Persulfate (potassium peroxy disulfate) | $K_2S_2O_8$ | 70 | 158 |
| Calcium Peroxide | $CaO_2$ | 100 | 212 |
| Potassium Pyrophosphate | $K_4P_2O_7 \cdot 3H_2O$ | 180 | 356 |

The above table is exemplary of the oxygen releasing compounds usable upon heating. Additionally a variety of ureas with low-melting points may be used, as well as many other compounds with low melting points, say those in the decomposition range of 100° to 360° farenheit. Mixtures of these compounds may be used.

It will be appreciated that normally, without this invention, the automotive engine has a butterfly in its carburetor air intake port which is held closed during internal heating up of the automotive engine. Consequently, the engine runs with a very rich mixture, in fact almost 100% fuel and no air. It can therefore be appreciated that the fact there is a delay time to heat up element 25 and start releasing of oxygen from compound 22, is no detriment in this improvement as no oxygen would be required anyway in the initial start phase of the engine.

Figure 3:
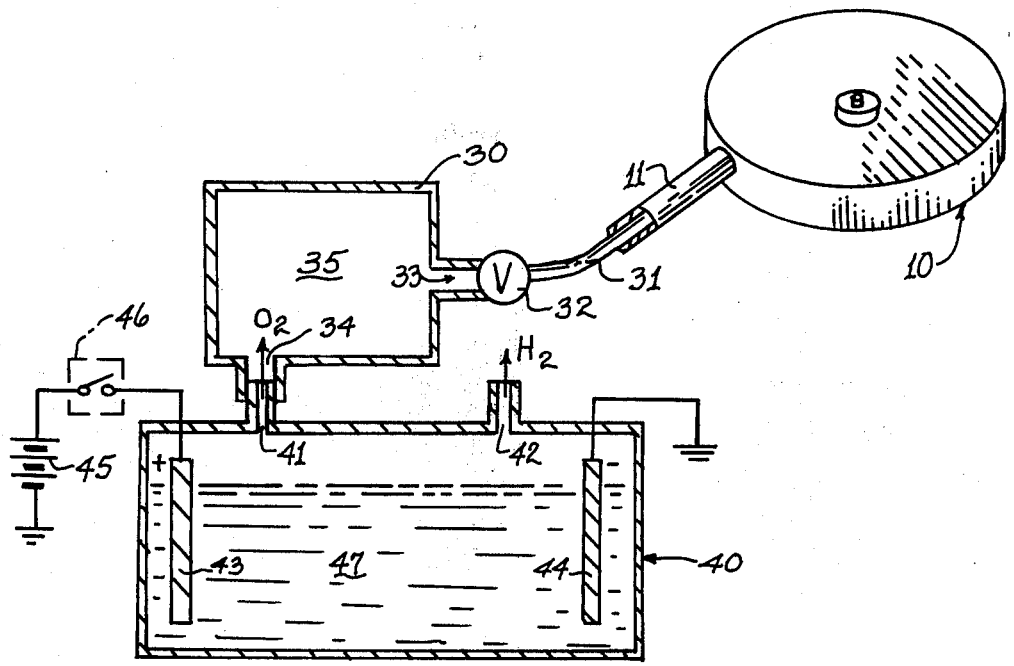
FIG. 3 is a view partially in perspective and partially in cross-section of an automotive air filter retainer, its intake connected to a tank in which oxygen is stored after being generated by an electrolysis apparatus for the breakdown of water into its component parts.

Referring to FIG. 3, conventional air filter retainer of an autombile as used for air intake and normally installed as described in connection with FIG. 1 is indicated at 10.

Filter retainer 10 has an air intake extension 11 that is connected to supply port 31 of oxygen storage tank 30. Valve 32 is inserted between port 31 and exit port 33 of tank 30. Tank 30 may be of any suitable strong material such as stainless steel to prevent oxidation of inner surface. Tank 30 has an entrance port 34 through which oxygen flowing therethrough is stored in tank 30 as at 35.

An electrolysis cell made out of a ceramic material or stainless steel as at 40 has port 41 through which oxygen is released into the tank, and port 42 through which hydrogen may be released into the atmosphere.

Cell 40 has two non-reactive or non-corrosive electrodes which may be made of platinum, or sometimes carbon shown at 43 and 44. Electrode 43 is the electrode which has a positive potential applied from battery 45 through ignition switch 46, whereas electrode 44 is at negative or ground potential. The battery voltage may be in the order of 6 to 12 volts D.C.

A dilute solution of sulfuric acid and water, about 90% water and 10% sulfuric acid, although the proportion is not critical, is stored in tank 40 at 47 by loading same through port 42. When the water is substantially used up, that is the acid becomes more concentrated due to electrolysis action, it may be replaced by injecting additional water through port 42. Suitable indicating means showing solution concentration, is well known in the art and need not be discussed herein.

The acid used in the cell is to provide electrical conductivity through the solution so as to enable electrolytic action to proceed to dissociate the oxygen from the hydrogen of the water by decomposition of the water into its component ports. The theory of electrolytic action of such cell is well known in the art and discussed in the text entitled, Physics by Hausmann and Slack, Second Edition 1939, at pages 389–391.

Consequently, the oxygen generated by the electrolytic cell is storable in a tank and used as required to provide the oxygen component to mix with the fuel for almost 100% fuel combustion, greater engine efficiency, lower fuel economy and substantial reduction in hydrocarbon and nitrous oxide exhausts from such automobile engine.

If a fuel injection system is used instead of a carburetor, the same apparatuses of FIGS. 1, 2 or 3 can be used to couple the pure oxygen output therefrom to the normal air intake means of the fuel injection system.

I claim:

1. A method for decreasing hydrocarbons and oxides of nitrogen emanating from an exhaust system of an internal combustion engine by supplying substantially pure oxygen to said engine, the improvement comprising the steps of:

storing a chemical source of oxygen which is at least one compound selected from the group consisting essentially of potassium perruthenate, potassium persulfate, calcium peroxide and potassium pyrophosphate in a chamber;

heating said at least one compound to a temperature within the range of about 100° to 360° farenheit so as to release oxygen therefrom; and passing the released oxygen to an intake of said engine.

2. The method of claim 1, wherein said chemical source of oxygen is limited to substantially a compound of potassium perruthenate.

3. The method of claims 1, wherein said chemical source of oxygen is limited to substantially a compound of potassium persulfate.

4. The method of claim 1, wherein said chemical source of oxygen is limited to substantially a compound of calcium peroxide.

5. The method of claim 1, wherein said chemical source of oxygen is limited to substantially a compound of potassium pyrophosphate.

* * * * *